United States Patent
Oikawa

(10) Patent No.: US 8,634,711 B2
(45) Date of Patent: *Jan. 21, 2014

(54) IMAGE CAPTURE APPARATUS AND METHOD

(71) Applicant: Makoto Oikawa, Yokohama (JP)

(72) Inventor: Makoto Oikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/653,585

(22) Filed: Oct. 17, 2012

(65) Prior Publication Data

US 2013/0038777 A1     Feb. 14, 2013

Related U.S. Application Data

(63) Continuation of application No. 12/849,870, filed on Aug. 4, 2010, now Pat. No. 8,315,514.

(30) Foreign Application Priority Data

Aug. 20, 2009    (JP) ................................. 2009-191473

(51) Int. Cl.
*G03B 13/00*     (2006.01)
*G03B 17/00*     (2006.01)
*H04N 5/228*     (2006.01)

(52) U.S. Cl.
USPC ........ 396/127; 396/55; 348/356; 348/208.11; 348/208.12; 250/201.8

(58) Field of Classification Search
USPC ............ 396/127, 55; 348/356, 208.99, 208.7, 348/208.11, 208.12; 250/201.7, 201.8
See application file for complete search history.

(56) References Cited

U.S. PATENT DOCUMENTS

| | | |
|---|---|---|
| 6,822,758 B1 * | 11/2004 | Morino ........................... 358/1.9 |
| 8,315,514 B2 * | 11/2012 | Oikawa ........................... 396/127 |
| 2005/0023435 A1 * | 2/2005 | Yasuda ...................... 250/201.2 |
| 2009/0244300 A1 * | 10/2009 | Levin et al. ................. 348/208.5 |

* cited by examiner

*Primary Examiner* — Rochelle-Ann J Blackman
(74) *Attorney, Agent, or Firm* — Cowan, Liebowitz & Latman, P.C.

(57) ABSTRACT

An image capture apparatus comprises: a moving unit configured to move a focus position of a photographing lens relative to an image sensor at a predetermined amplitude by changing a distance in an optical axis direction between the photographing lens and the image sensor; detection unit configured to detect a focus state of an image obtained from the image sensor; and defocus correction unit configured to perform defocus correction on the image obtained from the image sensor during motion performed by the moving unit, based on the focus state detected by the detection unit, so that the focus state of each image for display on the display device at least approaches the focus state for an in-focus image.

10 Claims, 6 Drawing Sheets

IMAGE CAPTURE APPARATUS AND METHOD

CROSS-REFERENCE TO RELATED APPLICATIONS

This application is a continuation of application Ser. No. 12/849,870, filed Aug. 4, 2010, the entire disclosure of which is hereby incorporated by reference.

BACKGROUND OF THE INVENTION

1. Field of the Invention

The present invention relates to an image capture apparatus and method, and more specifically to an image capture apparatus having a so-called "wobbling" function that detects a focus state of the photographing lens by reciprocally moving a focus position of a photographing lens relative to an image sensor at a predetermined amplitude by changing the distance in the optical axis direction between the photographing lens and the image sensor, and an image capture method.

2. Description of the Related Art

Conventionally, a wobbling method used in contrast AF for detecting a focus state based on the contrast of captured images is known as a method for detecting a focus state to provide automatic focus functions (AF system), as disclosed in Japanese Patent Laid-Open No. 2006-146062. Such an AF system that controls focusing by the wobbling method generally operates as follows.

First, an in-focus state is attained by contrast AF (hill-climbing detection method), then an image is captured at regular intervals with a focusing lens being reciprocally driven (wobbled) within a narrow amplitude range centered on an in-focus position, and the in-focus position is determined based on the contrast of captured image signals. Then, in a case where the in-focus position is changed, if the change is small, reciprocating motion is continued after changing the center of the amplitude of reciprocal drive to the changed in-focus position, and if the change is large, focusing is controlled by the hill-climbing detection method.

In contrast AF, the contrast of images captured at, at least, two focusing lens positions is compared so as to determine a direction to the in-focus position. Thus, at the time of wobbling, once focused state is achieved, the contrast of images obtained at different lens positions by minutely driving the focusing lens is compared in order to maintain the in-focus state.

However, there is a problem with the wobbling method disclosed in Japanese Patent Laid-Open No. 2006-146062 in that, in a case where the focal plane of the focusing lens greatly deviates from the photoreceiving surface of the image sensor during wobbling, defocusing can be noticed by the photographer.

For this reason, it is a common practice to set the amount of change of the focusing lens during wobbling such that the amount of defocusing occurring becomes smaller than an acceptable circle of confusion, thereby preventing defocusing of an image from being noticeable to the photographer. However, there is still a possibility that defocusing or a change in defocusing during wobbling is noticeable to the photographer under conditions as follows:

(1) A case where a photographing lens with no capability for high-precision minute drive is mounted on an interchangeable lens camera;
(2) A case where an acceptable circle of confusion is considerably reduced in size due to the miniaturization of the image sensor;
(3) A case of detecting the focus of a moving subject.

SUMMARY OF THE INVENTION

The present invention has been made in consideration of the above situation and, in an image capture apparatus that has a function of reciprocally moving the focus position of a photographing lens relative to an image sensor at a predetermined amplitude, aims at making defocusing of an image or a change in defocusing during reciprocating motion less noticeable to a photographer.

The present invention in its first aspect provides an image capture apparatus comprising: a moving unit configured to move a focus position of a photographing lens relative to an image sensor at a predetermined amplitude by changing a distance in an optical axis direction between the photographing lens and the image sensor; a detection unit configured to detect the focus state of each image obtained from the image sensor; and a defocus correction unit configured to performing defocus correction on each image obtained from the image sensor during said movement performed by the moving unit, based on the focus state of each image detected by the detection unit, so that the focus state of each image for display on a display device at least approaches the focus state for an in-focus image.

The present invention in its second aspect provides an image capture method comprising: a shooting step of capturing an image from an image sensor during motion, in which a focus position of a photographing lens is moved relative to the image sensor at a predetermined amplitude, by changing a distance in an optical axis direction between the photographing lens and the image sensor; a detection step of detecting the focus state of each image obtained from the image sensor in the shooting step; and a defocus correction step of performing defocus correction on the image obtained from the image sensor in the shooting step, based on the focus state of each image detected in the detection step, so that the focus state of each image for display on a display device at least approaches the focus state for an in-focus image.

Further features of the present invention will become apparent from the following description of exemplary embodiments with reference to the attached drawings.

DESCRIPTION OF THE EMBODIMENTS

Preferred embodiments of the present invention will be described in detail in accordance with the accompanying drawings.

First Embodiment

Figure 1:
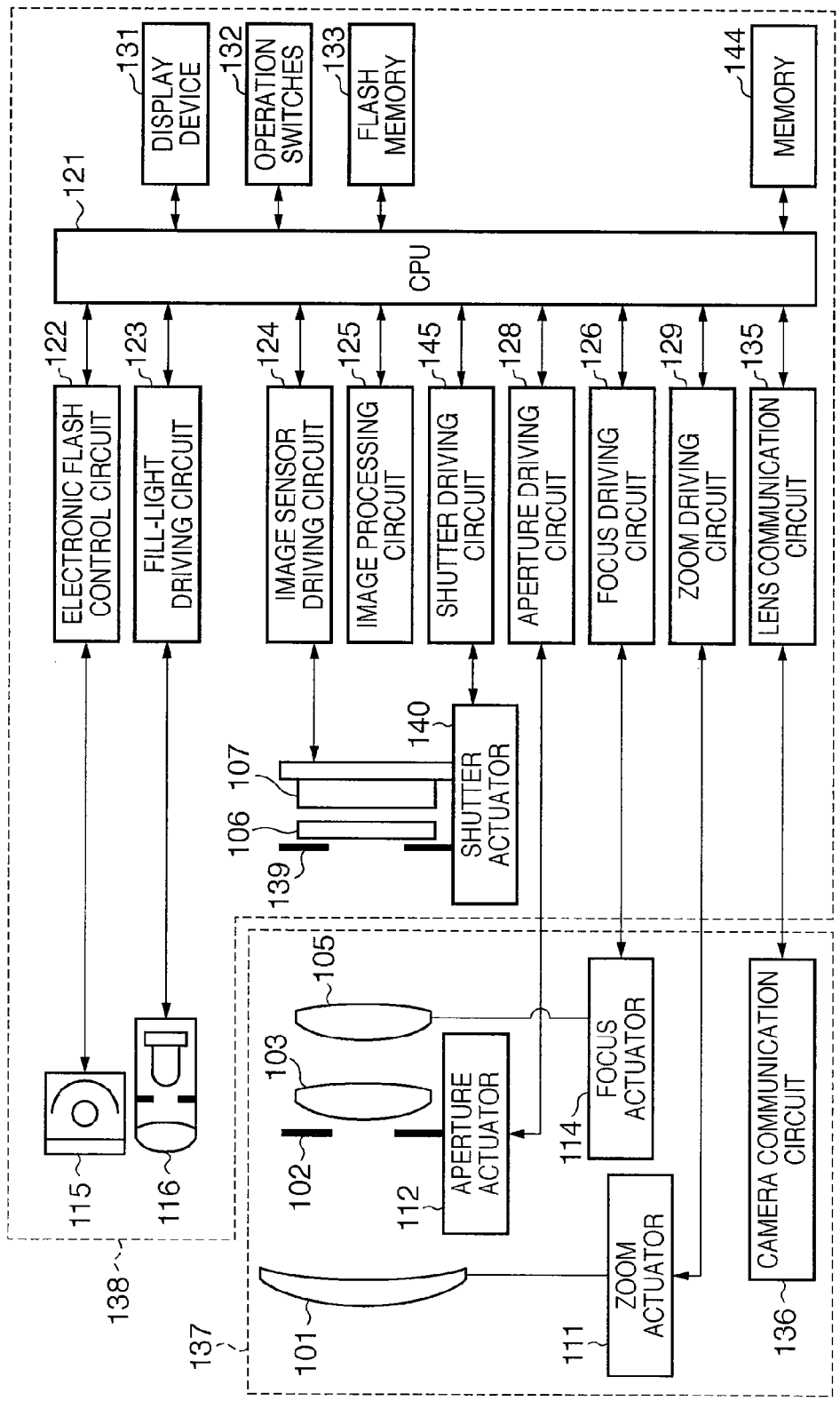
FIG. 1 is a block diagram showing a configuration of an image capture apparatus according to a first embodiment of the present invention.

FIG. 1 is a block diagram showing a configuration of an image capture apparatus according to a first embodiment, in which the image capture apparatus is constituted by a digital camera body 138 that includes an image sensor, and a photographing lens 137 that is removable from the camera body 138.

A description is first given regarding a configuration of the photographing lens 137. Reference numeral 101 denotes a first lens group that is located closest to a subject in an image capture (imaging) optical system and held so that it is movable forward and backward in an optical axis direction. Reference numeral 102 denotes an aperture that controls the amount of light at the time of shooting through control of the aperture size. Reference numeral 103 denotes a second lens group. The aperture 102 and the second lens group 103 move forward and backward as a single unit in the optical axis direction and realize scaling operations (zoom functions) in combination with forward and backward motion of the first lens group 101. Reference numeral 105 denotes a third lens group that performs focusing by moving forward and backward in the optical axis direction.

Reference numeral 111 denotes a zoom actuator that drives the first lens group 101, the aperture 102, and the second lens group 103 forward and backward in the optical axis direction by rotationally moving a cam cylinder not shown, thereby enabling scaling operations. Reference numeral 112 denotes an aperture actuator that controls the aperture size of the aperture 102 so as to adjust the amount of incident light. Reference numeral 114 denotes a focus actuator that drives the third lens group 105 forward and backward in the optical axis direction so as to perform focusing.

Reference numeral 136 denotes a camera communication circuit that transmits information concerning the photographing lens 137 to the camera body 138, and receives information concerning the camera body 138 from the camera body 138. Note that the information concerning the photographing lens 137 refers to, for example, a zoom state, an aperture state, a focus state, and lens frame information, and the camera communication circuit 136 transmits this information to a lens communication circuit 135 that is provided on the camera body 138 side.

A description is next given regarding the camera body 138. Reference numeral 106 denotes an optical low-pass filter that is an optical element for reducing false colors and moiré in captured images. Reference numeral 107 denotes an image sensor that is constituted by a sensor including a photoelectric conversion element typified by a CCD or a CMOS sensor, and peripheral circuits therearound. The image sensor 107 may be a two-dimensional single-plate color sensor in which an on-chip Bayer-arrayed primary color mosaic filter is formed on a photoreceiving pixel array that is m pixels horizontally and n pixels vertically.

Reference numeral 139 denotes a shutter unit that controls the exposure time by its opening and closing at the time of still image shooting and is held open at the time of moving image shooting. Reference numeral 140 denotes a shutter actuator that actuates the shutter unit 139.

Reference numeral 115 denotes an electronic flash for illuminating a subject at the time of image capture, and it is preferably a flash light illuminator using a xenon tube and may alternatively be an illuminator equipped with continuous emission LEDs. Reference numeral 116 denotes an AF fill light projector that projects a mask image having a predetermined opening pattern to a field through a transmitter lens and thereby improves the capability of detecting a focus on a dark subject or a low-contrast subject.

Reference numeral 121 denotes a CPU within the camera, which controls the camera in various ways and includes an operation unit, a ROM, a RAM, an A/D converter, a D/A converter, and a communication interface circuit, for example. The CPU drives various circuits in the camera body 138 based on predetermined programs stored in the ROM and performs a series of operations such as AF, image capture, and image processing and recording.

Reference numeral 122 denotes an electronic flash control circuit that controls lighting of the electronic flash 115 in synchronization with image capturing operations. Reference numeral 123 denotes a fill-light driving circuit that controls lighting of the AF fill light projector 116 in synchronization with focus detecting operations. Reference numeral 124 denotes an image sensor driving circuit that drives the image sensor 107 as well as converting a captured image signal from analog to digital and transmitting the converted signal to the CPU 121. Reference numeral 125 denotes an image processing circuit that performs processing, such as γ conversion, color interpolation, and JPEG compression, on the image acquired from the image sensor 107.

Reference numeral 126 denotes a focus driving circuit that controls the drive of the focus actuator 114 based on the focus detection result and drives the third lens group 105 (focus lens) forward and backward in the optical axis direction so as to perform focusing. Reference numeral 128 denotes an aperture driving circuit that controls the drive of the aperture actuator 112 so as to control the opening of the aperture 102. Reference numeral 129 denotes a zoom driving circuit that drives the zoom actuator 111 in response to zoom operations performed by the photographer. Reference numeral 135 denotes a lens communication circuit that performs communications with the camera communication circuit 136 in the photographing lens 137. Reference numeral 145 denotes a shutter driving circuit that drives the shutter actuator 140.

Reference numeral 131 denotes a display device such as an LCD that displays information concerning the shooting mode of the camera, a preview image before shooting and a confirmation image after image capture, and an in-focus state display image at the time of focus detection, for example. Reference numeral 132 denotes a group of operation switches that include a power switch, a release (shooting trigger) switch, a zoom operation switch, a shooting-mode selection switch, for example. Reference numeral 133 denotes a removable flash memory that records captured images. Reference numeral 144 denotes a memory within the camera, which stores various data necessary for the CPU 121 to perform calculations.

In the above-configured image capture apparatus, contrast automatic focusing control (contrast AF) is performed as AF control, in which focusing is controlled by determining the degree of focus from high-frequency components of a signal obtained from the image sensor 107. Note that contrast AF is a known technique and is thus not described herein.

In the first embodiment, once the in-focus state is obtained at the time of moving image shooting, focusing control by the wobbling method is started. In ordinary cases, the amplitude of a lens at the time of wobbling is set so as not to cause noticeable defocusing. In general, the amplitude is set to be lower than or equal to Fδ, where F is the F number of the image capture optical system and δ is the diameter of the acceptable circle of confusion, so that defocusing is unnoticeable. However, when assuming an image capture apparatus that is equipped with a removable photographing lens 137 as shown in FIG. 1, if a photographing lens with no ability for high-precision minute drive is mounted on the apparatus, the wobbling amplitude may be higher than Fδ. Moreover, in a case where the acceptable circle of confusion δ becomes considerably small due to the miniaturization of an image sensor, Fδ becomes considerably lower and it may be difficult to reduce the wobbling amplitude to lower than or equal to Fδ. Still further, in the case of detecting the focus of a moving subject, the wobbling amplitude may have to be set a little high in order to capture a subject, so there is a possibility that the wobbling amplitude has to be set a little higher than Fδ. In such a case, if focusing control is performed by the wobbling method, defocusing of an image due to wobbling or a change in defocusing may be noticeable to the photographer.

Thus, in the first embodiment, processing as described below is performed so as to make defocusing of an image or a change in defocusing during wobbling less noticeable to the photographer.

Figure 2:
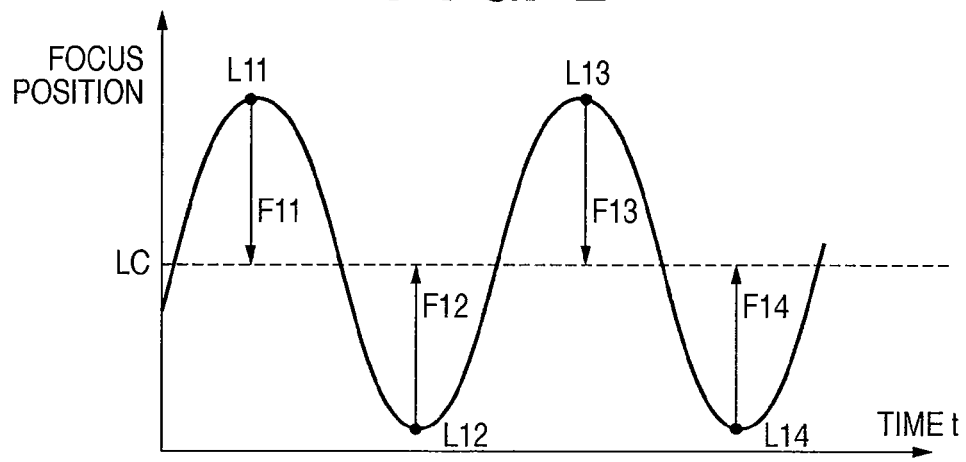
FIG. 2 is an explanatory diagram showing a defocus correction amount at the time of wobbling in a case where an in-focus position is within an amplitude range of the wobbling according to the first embodiment of the present invention.

FIG. 2 is an illustration of wobbling (during reciprocating motion), in which the focus position of the photographing lens 137 relative to the image sensor 107 is reciprocally moved at a predetermined amplitude by changing the distance in the optical axis direction between the photographing lens 137 and the image sensor 107. The horizontal axis represents time and the vertical axis represents a presumed position of an imaging plane of the photographing lens 137 relative to the image sensor 107, that is, the focus position.

In FIG. 2, reference characters L11, L12, L13, and L14 denote the focus positions at the time of image capture, showing movement such as reciprocating motion centered on an average value of L11 and L12. Reference character LC indicates an in-focus position that is approximately the center of the reciprocating motion of the focus position. Note that images are acquired at focus positions that are most distant from the center of the amplitude in the periodic change of the focus position as shown in FIG. 2. Such images obtained at the most distant focus positions are used to derive multiple AF evaluation values, from which the focus state of the photographing lens 137 can be detected.

Reference characters F11, F12, F13, and F14 denote defocus amounts at the focus positions L11, L12, L13, and L14, respectively. That is, images obtained at the focus positions L11, L12, L13, and L14 are low-quality, out-of-focus images that are defocused by the defocus amounts F11, F12, F13, and F14, respectively, from the in-focus position LC. Thus, in the first embodiment, such defocusing of an image obtained during wobbling is corrected and output.

Figure 3A:
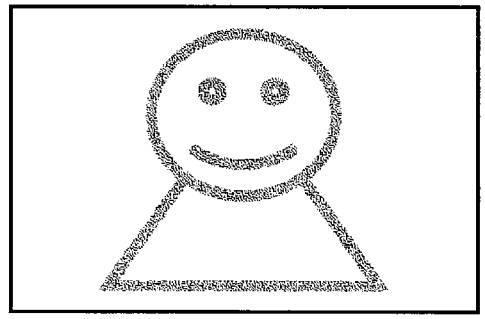
FIGS. 3A to 3C illustrate how defocus correction is performed in the situation of FIG. 2.
Figure 3B:
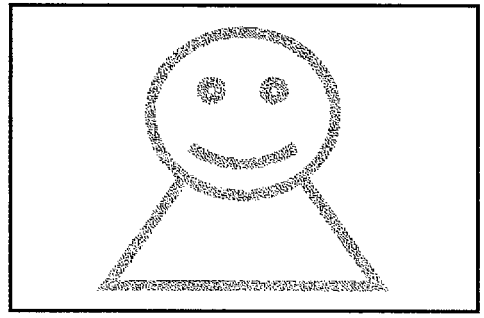
Figure 3C:
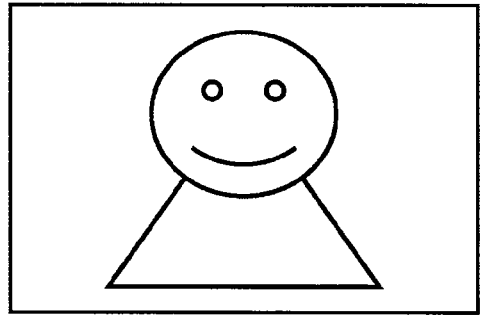

FIGS. 3A to 3C illustrate how an image defocused during wobbling as shown in FIG. 2 is corrected. FIG. 3A shows an image that has been obtained at the focus position L11 in FIG. 2 and in which the subject appears defocused due to defocusing by the defocus amount F11 from the in-focus position LC. Thus, defocus correction that shifts the focus position by F11 is performed on the image obtained at the focus position L11. FIG. 3B shows an image that has been obtained at the focus position L12 in FIG. 2 and in which the subject appears defocused due to defocusing by the defocus amount F12 from the in-focus position LC. Thus, defocus correction that shifts the focus position by F12 is performed on the image obtained at the focus position L12.

FIG. 3C shows an image after the defocus correction has been performed on the images in FIGS. 3A and 3B that have been obtained respectively at the focus positions L11 and L12 in FIG. 2. After the defocus correction, both of the images in FIGS. 3A and 3B that have been obtained at the focus positions L11 and L12 are in focus with their focus positions matching the in-focus position LC. Note that the defocus correction method will be described later.

Figure 4:
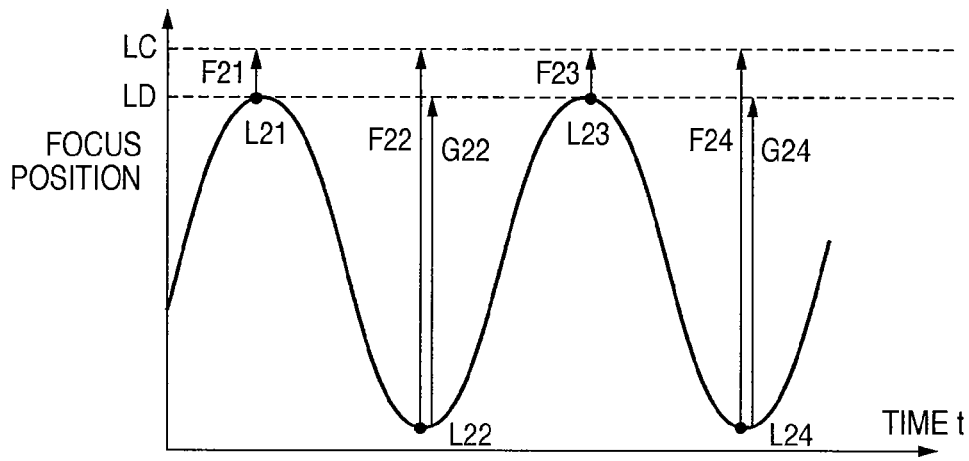
FIG. 4 is an explanatory diagram showing a defocus correction amount at the time of wobbling in a case where the in-focus position deviates from the amplitude range of the wobbling according to the first embodiment of the present invention.

FIG. 4 shows focus positions in a case where the in-focus position LC deviates from the range of the wobbling amplitude due to movement of a subject during wobbling, for example. Reference characters L21, L22, L23, and L24 denote the focus positions, showing movement such as reciprocating motion centered on an average value of L21 and L22. Reference character LC denotes the in-focus position, which is outside the range of the wobbling amplitude as described above. Reference characters F21, F22, F23, and F24 denote defocus amounts at the focus positions L21, L22, L23, and L24, respectively. Images obtained at the focus positions L21, L22, L23, and L24 are out-of-focus by the defocus amounts F21, F22, F23, and F24, respectively.

In this case, ideally, defocus correction is performed to generate images with their focus positions shifted by the defocus amounts F21, F22, F23, and F24 and the corrected images are recorded/displayed. However, although the direction to the in-focus position can be derived from AF evaluation values calculated from the images obtained at the focus positions L21, L22, L23, and L24, the defocus amounts cannot be derived. Accordingly, the precise location of the in-focus position LC cannot be determined.

Thus, in the first embodiment, assuming the focus positions L21 and L23 as a focus position LD, defocus correction is performed based on the amount of shift from the focus position LD, that is, based on defocus amounts at the focus positions L21, L22, L23, and L24. Accordingly, defocus correction that shifts the focus position is not performed on the captured images obtained at the focus positions L21 and L23. The captured images obtained at the focus positions L22 and L24 are subjected to defocus correction that shifts their focus positions by G22 and G24, respectively. This enables defocus correction to be performed as favorably as possible, even though the in-focus position LC is outside the amplitude range of the reciprocating motion of the focus position during wobbling.

Figure 5A:
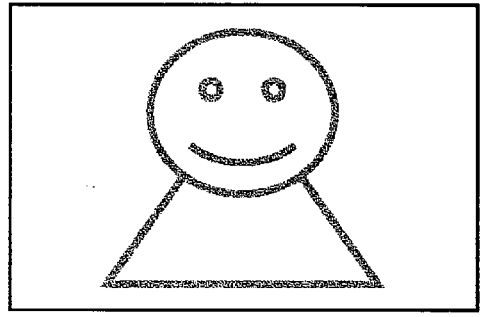
FIGS. 5A to 5C illustrate how defocus correction is performed in the situation of FIG. 4.
Figure 5B:
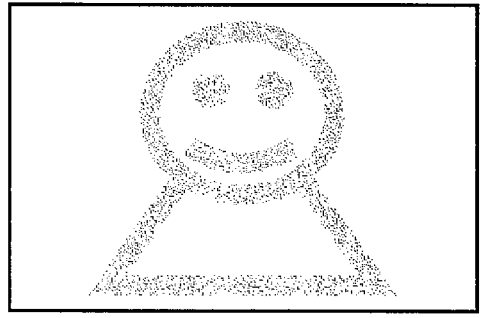
Figure 5C:
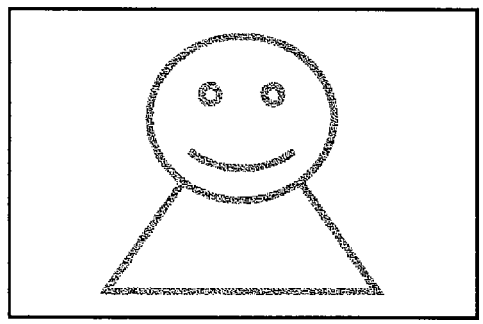

FIGS. 5A to 5C illustrate how an image defocused during wobbling as shown in FIG. 4 is corrected. FIG. 5A shows an image that has been obtained at the focus position L21 in FIG. 4 and in which the subject appears defocused due to defocusing by the defocus amount F21 from the in-focus position LC. However, since the defocus amount F21 is small, the subject in the image is defocused just a little. FIG. 5B shows an image that has been obtained at the focus position L22 in FIG. 4 and that is defocused by as large as F22 from the in-focus position LC. Since the defocus amount F22 is larger than the defocus amount F21, the subject is defocused more than the subject in the image obtained at the focus position L21, as shown in FIG. 5B.

FIG. 5C shows an image after defocus correction. In the first embodiment, since, as described above, defocus correction is not performed on the image obtained at the focus position L21, the image shown in FIG. 5C is an image after defocus correction by an amount equivalent to G22 has been performed on the image in FIG. 5B that has been obtained at the focus position L22 in FIG. 4. The image is just a little out of focus because its focus position after the defocus correction has approached the in-focus position LC.

As described above with reference to FIGS. 2 to 5C, generating an image by correcting defocusing due to wobbling as much as possible enables defocusing due to wobbling or a change in defocusing to be less noticeable to the photographer. This also improves image quality of recording images and preview images.

Figure 6A:
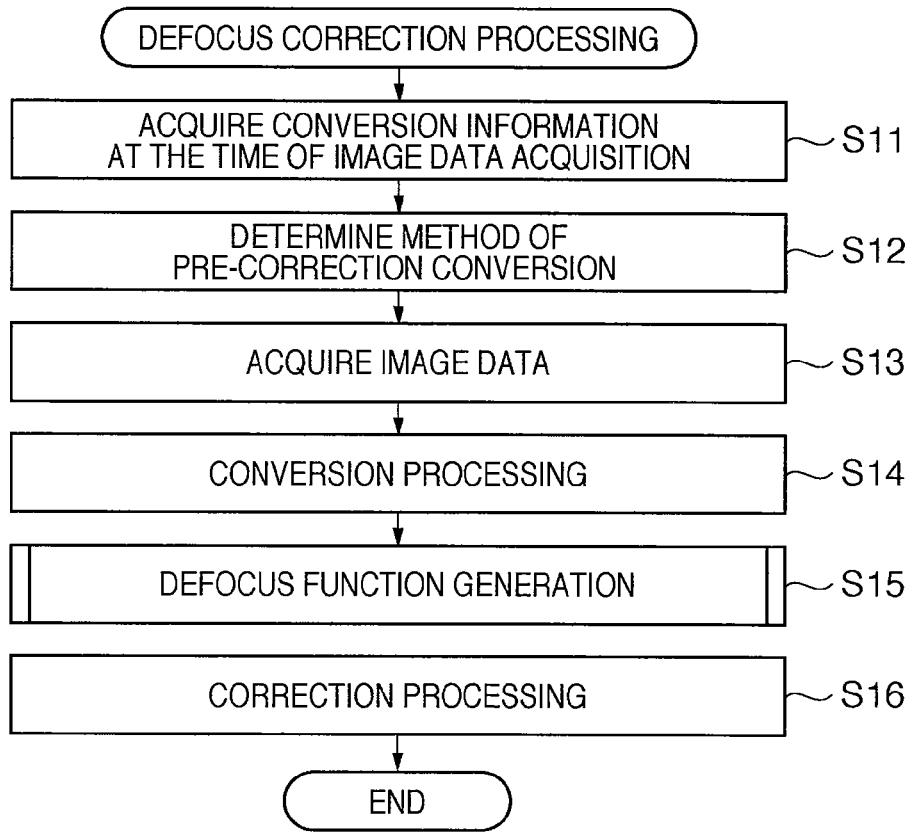
FIGS. 6A and 6B are flowcharts showing defocus correction processing according to the first embodiment of the present invention.
Figure 6B:
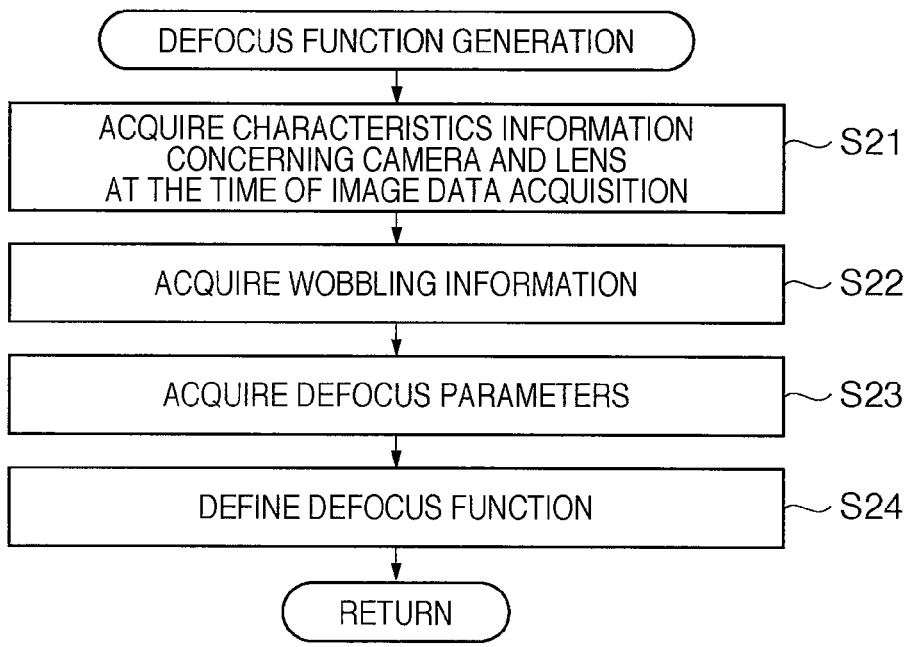

Next, a procedure for defocus correction processing performed during wobbling according to the first embodiment will be described with reference to FIGS. 6A and 6B. FIG. 6A is a flowchart showing defocus correction processing and FIG. 6B is a flowchart showing a procedure for generating a defocus function for use in defocus correction, where each series of operations is performed by the CPU 121.

In step S11, conversion information is acquired, which indicates the contents of conversion processing performed at the time of image data acquisition.

In step S12, a method of conversion performed on image data before correction processing is determined. The CPU 121 determines a conversion method used to convert image information supplied from the image processing circuit 125, based on the conversion information acquired in step S11 and, as necessary, characteristics information concerning the camera body 138 and characteristics information concerning the photographing lens 137. The conversion method determined herein is a method for converting image information so that there is a proportional relationship between the exposure value and the pixel value, in order to ensure linearity that is a precondition for the algorithm of image restoration processing.

For example, in a case where the image processing circuit 125 performs gamma correction, an inverse conversion of the gamma correction conversion is performed in step S12. This enables reproduction of the image before conversion and makes it possible to acquire an image with linearity. Similarly, in a case where the image processing circuit 125 performs color correction, an inverse conversion of the color correction conversion is performed in step S12. This enables acquisition of an image with linearity. As described above, a conversion method that corresponds to an inverse conversion of the conversion processing performed by the image processing circuit 125 is determined in step S12.

In step S13, captured image data that is subjected to defocus correction is acquired. Then in step S14, the acquired image data is converted according to the conversion method determined in step S12. After the conversion processing has been completed in step S14, the process proceeds to step S15, in which then a defocus function is generated. Note that the process of generating a defocus function will be described later with reference to FIG. 6B. In step S16, inverse conversion based on the defocus function generated in step S15 is performed so as to perform defocus correction processing on the image data that has been converted in step S14. Here, an image restoration algorithm that is generally called deconvolution processing performs the defocus correction processing. This enables acquisition of a defocus-corrected image in which defocusing of a predetermined subject has been corrected. Note that such a method of defocus correction for performing inverse conversion processing based on a defocus function has been disclosed in Japanese Patent Laid-Open No. 2000-20691, for example, and is thus not described herein. After the defocus correction processing has been completed in step S16, the defocus correction processing ends.

FIG. 6B is a flowchart showing a subroutine of defocus function generation.

In step S21, the CPU 121 acquires conversion information indicating the contents of conversion processing performed by the image processing circuit 125 at the time of image capture, and the characteristics information concerning the camera body 138 and the characteristics information concerning the photographing lens 137, which have been recorded in the memory 144 within the camera at the time of image capture. Here, the characteristics information concerning the camera body 138 includes information indicating the distribution of the photoreceiving sensitivity of pixels for shooting in the image sensor 107, vignetting information, information indicating the distance from a mounting surface between the camera body 138 and the photographing lens 137 to the image sensor 107, and manufacturing error information, for example. The characteristics information concerning the photographing lens 137 includes exit pupil information, frame information, F number information at the time of image capture, aberration information, and manufacturing error information, for example.

In step S22, information concerning wobbling is acquired. The wobbling information includes wobbling amplitude, period, in-focus determination results, and direction to in-focus position, for example. Such information enables inference of the focus position at the time of image capture, thus serving as an indicator designating defocus amounts used for defocus correction. The method for determining the defocus amount of an image obtained during wobbling has already been described with reference to FIGS. 2 and 4 and is thus not described herein.

In step S23, parameters (defocus parameters) that are used to define a defocus function are acquired. The defocus function is determined by light transmission characteristics between the photographing lens 137 and the image sensor 107. The light transmission characteristics vary depending on factors such as the characteristics information concerning the camera body 138, the characteristics information concerning the photographing lens 137, the wobbling information, the position of a subject region in the captured image, and a subject distance. Accordingly, table data that associates those factors with the parameters used to define the defocus function has been stored in the memory 144 within the camera. Then, based on those factors, the CPU 121 acquires parameters used to define the defocus function from the memory 144 within the camera in step S23.

In step S24, the defocus function is defined based on the defocus parameters acquired in step S23. The defocus function is considered as a light transmission function characteristic between the photographing lens 137 and the image sensor 107. An example of the defocus function is a Gaussian distribution in which a defocusing phenomenon is considered to be in accordance with the normal distribution law. The defocus function h(r) is given by Equation (1) as follows:

$$h(r) = \frac{1}{\sigma\sqrt{2\pi}} \exp\left(-\frac{r^2}{\sigma^2}\right) \quad (1)$$

where r is the distance from the center pixel and $\sigma^2$ is any parameter in accordance with the normal distribution law.

After the defocus function has been defined in step S24, the subroutine of defocus function generation ends and the defocus correction processing is performed in step S16 in FIG. 6A.

As described above, according to the first embodiment, the image capture apparatus having the wobbling function is capable of making defocusing or a change in defocusing during wobbling less noticeable to the photographer.

Second Embodiment

The aforementioned first embodiment has described the case where defocus correction is performed on an image in which defocusing has occurred due to wobbling operations at the time of moving image shooting. A second embodiment describes a case where defocus correction is performed on an image in which defocusing has occurred due to wobbling operations at the time of still image shooting. Note that an image capture apparatus according to the second embodiment has a similar configuration to that described with reference to FIG. 1 in the first embodiment and is thus not described herein.

Figure 7:
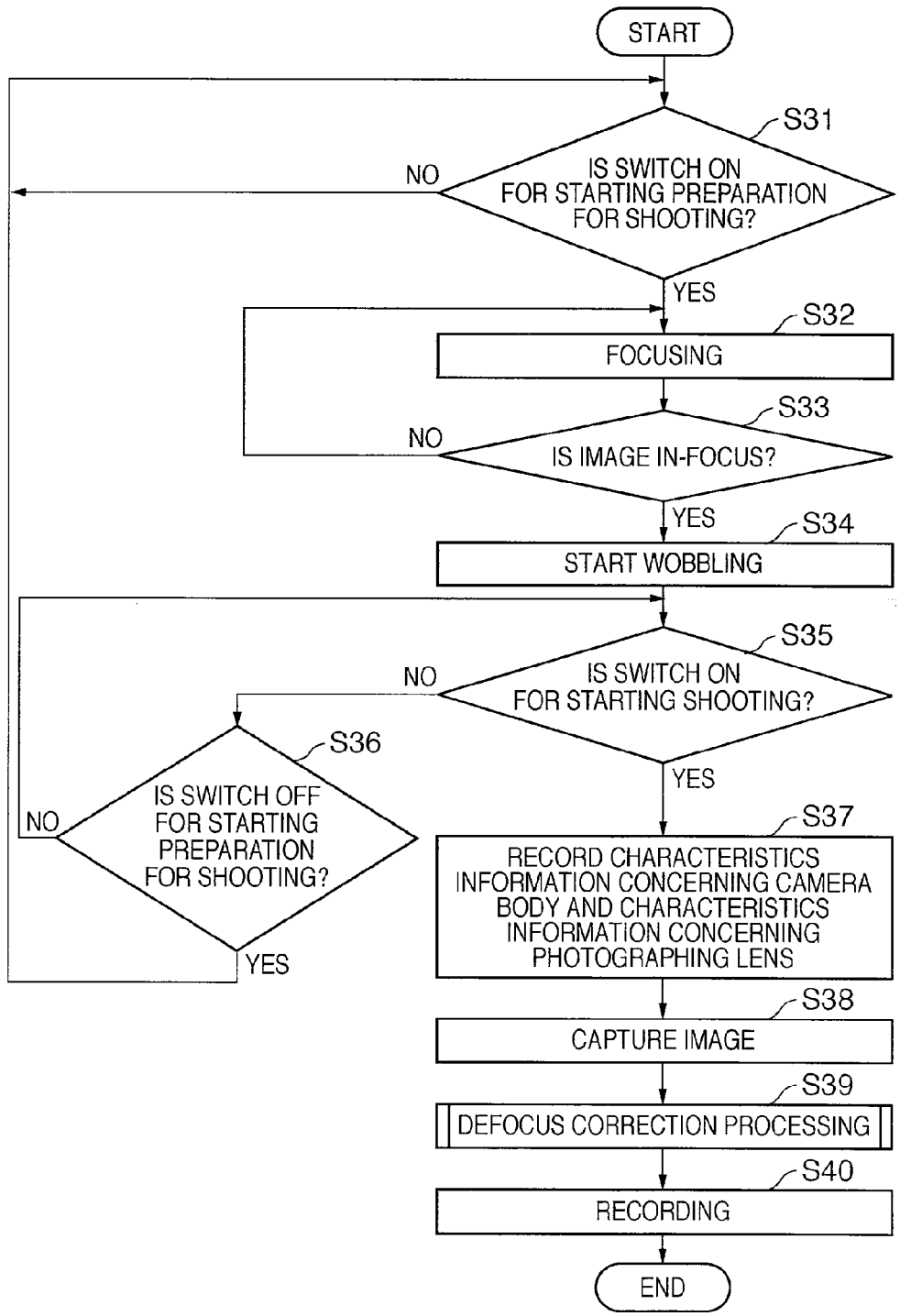
FIG. 7 is a flowchart showing a procedure for capturing a still image, involving defocus correction processing according to a second embodiment of the present invention.

Next, the process of capturing a still image according to the second embodiment will be described with reference to FIG. 7.

First, it is determined in step S31 whether or not an instruction to start preparation for shooting has been given by the operation of the release switch (for example, a half-pressed operation) out of the operation switches 132. Upon instruction to start preparation for shooting, the process proceeds to step S32, in which focusing processing is performed. Then, it is determined whether or not focusing has been achieved, and if focusing has not been achieved (NO in step S33), the process returns to step S32, in which the focusing processing is continued. On the other hand, if the focusing has been achieved (YES in step S33), the process proceeds to step S34, in which wobbling is started. In step S35, it is determined whether an instruction to start shooting has been given by the operation of the release switch (for example, a full-pressed operation), and if the instruction has not been given, it is determined in step S36 whether or not the instruction to start preparation for shooting has been cancelled. If the instruction has been cancelled, the process returns to step S31, and if not, the process repeats the determination of step S35.

Upon being instructed to start shooting (YES in step S35), the characteristics information concerning the camera body 138 and the characteristics information concerning the photographing lens 137 are recorded in the flash memory 133 and the memory 144 within the camera (step S37). Here, the characteristics information concerning the camera body 138 includes information indicating the distribution of the photoreceiving sensitivity of pixels for shooting in the image sensor 107, beam vignetting information, information indicating the distance from the mounting surface between the camera body 138 and the photographing lens 137 to the image sensor 107, and manufacturing error information, for example. Since the information indicating the distribution of the photoreceiving sensitivity of images for shooting in the image sensor 107 is determined by an on-chip microlens and a photoelectric conversion unit, information concerning the lens and unit may also be recorded. The characteristics information concerning the photographing lens 137 includes exit pupil information, frame information, F number information at the time of shooting, aberration information, and manufacturing error information, for example.

Then, a still image is captured and various known processing is performed on the captured image signal to acquire image data (step S38), and defocus correction processing is performed on the acquired image data (step S39). Note that the defocus correction processing performed here proceeds in a similar manner to the processing described with reference to FIGS. 2 to 6B in the first embodiment and is thus not described herein. Then, the image data that has undergone the defocus correction processing is recorded in the flash memory 133 (step S40) and the process ends. That is, the defocus-corrected image is stored in the flash memory 133. Note that image data that has undergone the defocus correction processing as described above may be displayed as a confirmation image on the display device 131.

As described above, according to the second embodiment, defocus correction processing is performed on a captured image in which defocusing has occurred due to wobbling, by inferring the shape of the defocusing based on the characteristics information concerning the photographing lens, the characteristics information concerning the image capture apparatus, and the wobbling information and then performing an inverse conversion thereof. Thus, the captured image that has been recorded in step S40 is an image in which defocusing due to wobbling has been corrected. This achieves an image capture apparatus that is capable of making defocusing or a change in defocusing during wobbling less noticeable to the photographer.

Moreover, in the image capture apparatus according to the second embodiment, as described above, a defocus-corrected captured image and the characteristics information corresponding to the captured image and concerning the camera body 138 and the photographing lens 137 are recorded in the flash memory 133. By doing so, even if defocus correction by the image capture apparatus is not satisfactory, it is possible to, after shooting, re-execute defocus correction of the captured image based on the characteristics information concerning the camera body 138 and the characteristics information concerning the photographing lens 137.

Modified Example

The aforementioned first and second embodiments have described the cases where wobbling is made by driving the photographing lens 137. However, since wobbling requires only reciprocating motion of the distance between the photographing lens 137 and the image sensor 107 in the optical axis direction, it may be made by driving not the photographing lens 137, but rather the image sensor 107 forward and backward in the optical axis direction.

Figure 8:
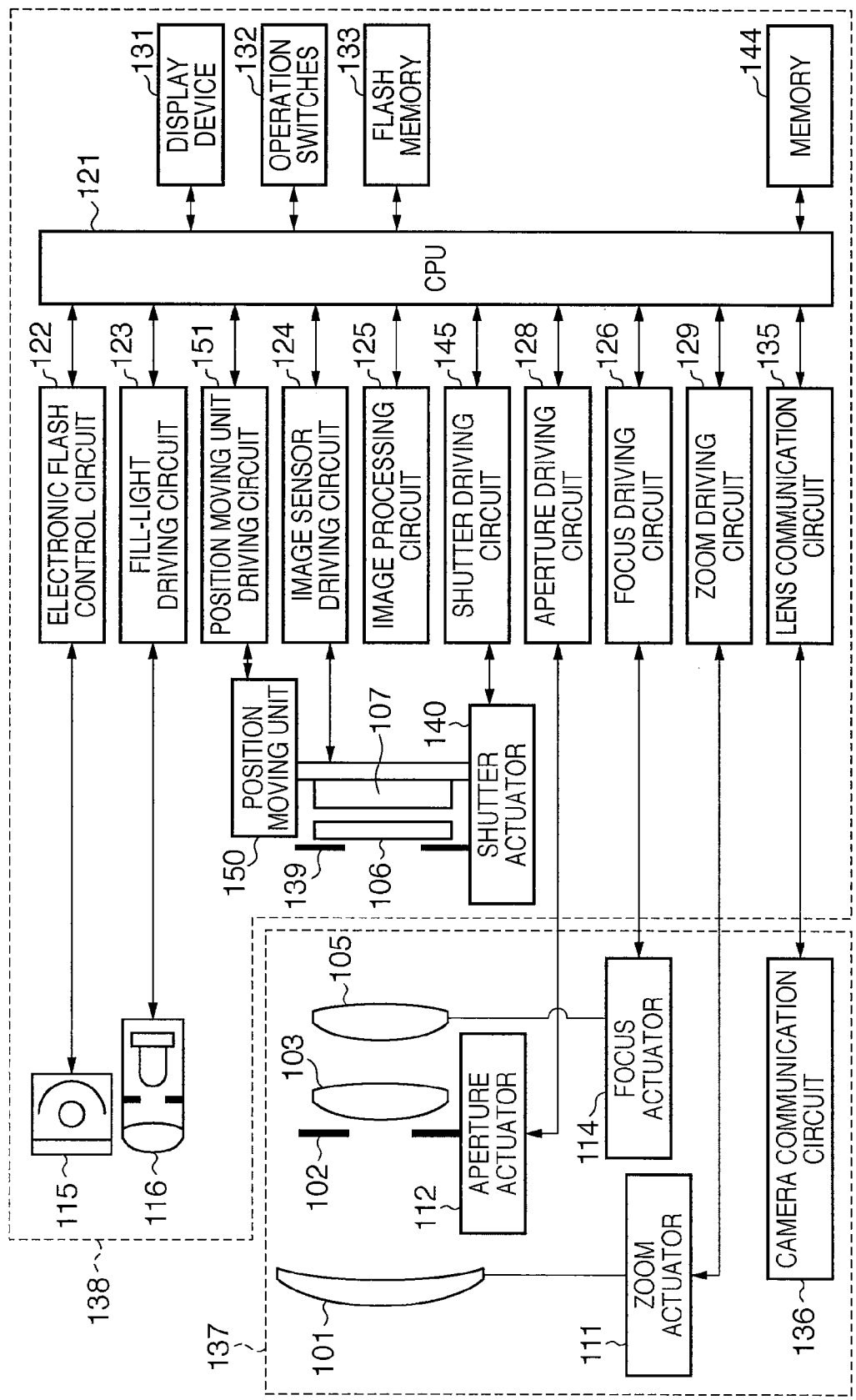
FIG. 8 is a block diagram showing a configuration of an image capture apparatus according to a modified example of the present invention.

FIG. 8 is a block diagram showing a configuration of an image capture apparatus according to a modified example of the present invention. What is different from the configuration of the image capture apparatus shown in FIG. 1 is that it includes a position moving unit 150 for driving the image sensor 107 in the optical axis direction and a position moving-unit driving circuit 151. Other aspects of the configuration are similar to those in the configuration in FIG. 1, so the description thereof has been omitted here. With the configuration shown in FIG. 8, during wobbling, the position moving unit 150 moves the position of the image sensor 107 relative to the photographing lens 137 in the optical axis direction, which eliminates the need to drive the photographing lens 137 for wobbling.

In the case of an electronic camera that includes an interchangeable photographing lens 137 in the camera body 138, various kinds of lenses are conceivable as the photographing lens 137. If a focusing lens with low drive accuracy is mounted on the camera, wobbling may not be possible. In such a case, if the image capture apparatus is equipped with the position moving unit 150 that drives the image sensor 107 forward and backward in the optical axis direction, it is possible to achieve stable wobbling without being affected by the focusing drive accuracy of the mounted photographing lens.

While the above embodiments have been described with a camera with a replaceable photographing lens, the invention is also applicable to a camera that includes a built-in photographing lens in the camera body, what is called a lens-integrated camera. By displaying defocus-corrected captured images with such a lens-integrated camera, it is also possible to achieve similar effects to those as described in the above embodiments.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2009-191473, filed on Aug. 20, 2009 which is hereby incorporated by reference herein in its entirety.

What is claimed is:

1. An image capturing apparatus comprising:
a moving unit configured to move a focus position within a predetermined range by changing a distance in an optical axis direction between a photographing lens and an image sensor;
a detection unit configured to detect the focus state of an image obtained from an image sensor; and
a defocusing correction unit configured to perform image processing to correct defocusing of the image obtained from the image sensor using the focus state of the image detected by the detection unit during said movement performed by the moving unit,
wherein, in a case where the focus state detected by the detection unit indicates that a focus position for an in-focus image is within the range of the motion, the defocusing correction unit performs the image processing based on a difference between the focus position for an in-focus image and a focus position at which the image has been captured during the motion, and wherein, in a case where the focus state detected by the detection unit indicates that the focus state for an in-focus image is beyond the range of the motion, the defocusing correction unit performs the image processing based on a difference between a focus position within the range on a side close to the focus state for an in-focus image and the focus position at which the image has been captured during the motion.

2. The image capturing apparatus according to claim 1, wherein, in a case where the focus-state detected by the detection unit indicates that the focus state for an in-focus image is beyond the width of the motion, the defocusing correction unit performs the image processing based on a difference between a focus position within the width on a side close to the focus state for an in-focus image and a focus position at which the image has been captured during the motion.

3. The image capturing apparatus according to claim 1, wherein the image processing performed by the defocusing correction unit is deconvolution processing.

4. The image capturing apparatus according to claim 3, wherein the deconvolution processing is based on a light transmission function characteristic between the photographing lens and the image sensor.

5. The image capturing apparatus according to claim 1, wherein the moving unit moves the photographing lens relative to the image sensor in the optical axis direction.

6. The image capturing apparatus according to claim 1, wherein the moving unit moves the image sensor relative to the photographing lens in the optical axis direction.

7. The image capturing apparatus according to claim 1, wherein the moving unit reciprocally moves a focus position at a predetermined amplitude for detecting the focus state of the image obtained from the image sensor.

8. The image capturing apparatus according to claim 1, wherein the moving unit performs wobbling operation for detecting the focus state of the image obtained from the image sensor.

9. The image capturing apparatus according to claim 1, wherein the defocusing correction unit perform the image processing to correct defocusing of an image obtained from the image sensor further using the focus state of another image detected by the detection unit during said movement performed by the moving unit.

10. An image capturing method comprising:
a shooting step of capturing an image from an image sensor during motion, in which a focus position is moved within a predetermined range, by changing a distance in an optical axis direction between a photographing lens and an image sensor;
a detection step of detecting the focus state of an image obtained from the image sensor in the shooting step; and
a defocusing correction step of performing image processing to correct defocusing of the image obtained from the image sensor in the shooting step using the focus state of the image detected in the detection step,
wherein, in a case where the focus state detected in the detection step indicates that a focus position for an in-focus image is within the range of the motion, in the defocusing correction step the image processing is performed based on a difference between the focus position for an in-focus image and a focus position at which the image has been captured during the motion, and wherein, in a case where the focus-state detected by the detection unit indicates that the focus state for an in-focus image is beyond the range of the motion, the defocusing correction unit performs the image processing based on a difference between a focus position within the range on a side close to the focus state for an in-focus image and the focus position at which the image has been captured during the motion.

* * * * *